United States Patent [19]

Saijo et al.

[11] 4,381,478

[45] Apr. 26, 1983

[54] CONTROL SYSTEM FOR A LINEAR SYNCHRONOUS MOTOR

[75] Inventors: Takashige Saijo, Kunitachi; Haruo Ikeda, Hyuga; Kiyoshi Nakamura; Shigeyoshi Koike, both of Katsuta, all of Japan

[73] Assignees: Hitachi, Ltd.; Japanese National Railways, both of Tokyo, Japan

[21] Appl. No.: 241,372

[22] Filed: Mar. 6, 1981

[30] Foreign Application Priority Data

Mar. 7, 1980 [JP] Japan .................................. 55-27974
Mar. 7, 1980 [JP] Japan .................................. 55-27975
Mar. 7, 1980 [JP] Japan .................................. 55-27976
Mar. 7, 1980 [JP] Japan .................................. 55-27977

[51] Int. Cl.³ ........................... H02P 5/40; H02K 41/00
[52] U.S. Cl. ........................... 318/135; 318/687; 104/292; 246/182 C
[58] Field of Search ............... 318/135, 687; 104/292; 246/182 C; 310/12-14

[56] References Cited

U.S. PATENT DOCUMENTS

| | | | |
|---|---|---|---|
| 3,891,833 | 6/1975 | Rhoton et al. | 246/182 C |
| 3,904,942 | 9/1975 | Holz | 104/292 |
| 3,974,778 | 8/1976 | Black et al. | 104/292 |
| 4,142,700 | 3/1979 | Ubel | 246/182 C |

*Primary Examiner*—David Smith, Jr.
*Attorney, Agent, or Firm*—Antonelli, Terry & Wands

[57] ABSTRACT

In a magnetic floating type of super high speed transportation system using a linear synchronous motor system as its drive system in which a field magnet is carried on a train and a series of armature coils are provided along a track, a speed of a train is regulated under control of a frequency converter of the variable frequency and voltage type for supplying power to the armature coils. For the speed regulation, a relative position of the field magnet to the armature coils is detected to form a train of position detecting pulses. A reference frequency pattern with a frequency corresponding to a speed command is formed. A phase difference between the reference frequency pattern and the position detecting pulse train is detected. A propulsion force command of a linear motor is obtained by setting different limit values in the positive and negative parts of the phase difference signal. A sinusoidal current waveform pattern is formed in synchronism with the position detecting pulse train. By multiplying the current waveform pattern by the propulsion force command, a sinusoidal armature current pattern is obtained of which the frequency and the crest value are fixed. The cycloconverter is controlled so as to provide an armature current following the armature current pattern, whereby the vehicle speed accurately follows the speed command.

21 Claims, 9 Drawing Figures

CONTROL SYSTEM FOR A LINEAR SYNCHRONOUS MOTOR

The present invention relates to improvements in a linear synchronous motor and, more particularly, to a control system suitable for a vehicle control of a super high speed transportation system.

A system generally considered most suitable for propulsion force of the vehicles in the ultra high speed transportation system is a linear synchronous motor (hereinafter referred to as LSM) in which a superconductive magnet is carried as a field magnet on the vehicle and a series of armature coils are provided along a track. To drive the LSM, a current such as a sine wave is fed to the armature coils in synchronism with the field magnet. To adjust the propulsion force of the LSM, the current value of the armature coils is controlled.

Such a control system is described in Japanese Patent No. 1,013,647 specification (Japanese Patent Application Publication No. 2805/80), for example. The control system detects a relative position of the field magnet carried on the vehicle to the armature coils laid along the track, and computes a real speed of the vehicle. The real speed is compared with a speed pattern to compute a magnitude of current to be fed to the armature coils. A current waveform pattern synchronized with the detected position signal is formed and a crest value of the current waveform pattern is adjusted by a signal representing a magnitude of a desired current calculated. In this way, a current pattern is formed which is synchronized with a current to be fed to the armature coils and of which the crest value is proportional to that current. The armature current is made to follow the current pattern by controlling a power converter in accordance with the current pattern thus formed.

The armature coils are of the polyphase type and generally of the three-phase type. The desirable power converter for supplying power to the armature coils is a three-phase cycloconverter of the variable frequency and voltage type, as disclosed in Japanese Laid-Open Patent Application Publication No. 13918/79. The final subject to be achieved by the control system is to control the speed of the vehicle. In this respect, the LSM must be operated with a proper propulsion force in order to quickly reach a target speed or to lessen a speed difference between the current vehicle speed and the target speed. According to the conventional control system the target speed is compared with the real speed thereby to adjust the current value so as to decrease the difference between them. This conventional system has the following disadvantages, however. The speed of the vehicle is greatly influenced by an accuracy of the speed computing device. For example, when the accuracy of the speed computation is ±2%, ±10 Km/h of an error is produced at 500 Km/h of the maximum vehicle speed. In order to make the speed control response quick and make the speed difference small, the gain of the speed control system must be large. In this case, if there is a variation in the results of the computation by the speed computing device, the current value fluctuates to cause a pulsating propulsion force in the vehicle drive and to impair a smooth ride.

If the gain of the speed control system is decreased to alleviate the adverse effect by the variation in the speed computation result, the response of the speed control is deteriorated and the speed difference increases. As described above, the control method to set the current pattern on the basis of the speed difference is still insufficient in the follow-up performance in the speed control of the vehicle and the accuracy of the speed control.

Accordingly, an object of the present invention is to provide a control system for a linear synchronous motor with a high accuracy of the speed control.

To achieve the above object, the present invention is to obtain a phase difference between the position signal with a frequency equal to the speed of the linear synchronous motor and a frequency pattern corresponding to a speed pattern of the vehicle and to adjust a magnitude of the current pattern fed to the armature coils of the LSM in accordance with the phase difference, thereby to control the LSM.

More specifically, a frequency pattern having a frequency proportional to an externally supplied speed pattern is formed. A frequency corresponding to a real speed of the linear motor may be obtained by a means for detecting a relative position of the armature coils of the synchronous motor to the field magnet. A propulsion force pattern of the linear motor is computed in accordance with a phase difference between the speed frequency pattern and the output frequency signal of the position detecting means. The propulsion force pattern is used for adjusting the crest value of a current waveform pattern synchronized with the output signal from the position detecting means.

An error of the speed is expressed by a frequency difference between the speed frequency pattern and the frequency signal corresponding to a real speed of the linear synchronous motor. The speed error first appears as a phase difference between the speed frequency pattern and the frequency signal. The speed control performance may remarkably be improved by adjusting the propulsion force of the linear synchronous motor in accordance with the phase difference.

Figure 1:
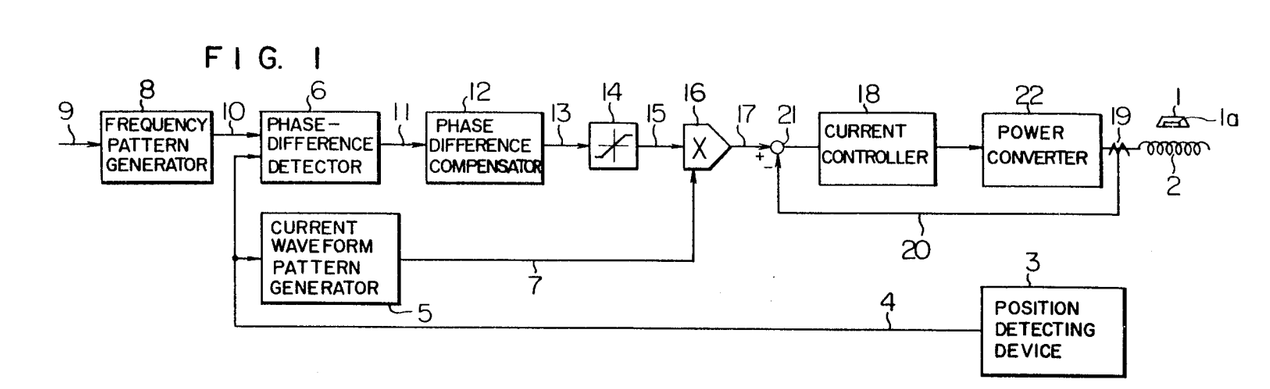
FIG. 1 shows a schematic block diagram of an embodiment of a control system for a linear synchronous motor according to the present invention.

In FIG. 1 illustrating in block form a control system for a linear synchronous motor according to the present invention, a relative position of a field magnet 1a carried on a vehicle 1 to armature coils 2 installed along a track is detected by a position detecting device 3. Various types of known devices may be used for the position detecting device 3; a device for optically detecting plates arranged at the pole pitches of the armature coils 2, a device using cross induction lines crossed at the pole pitches of the armature coils 2, and a device for detecting a voltage induced in the armature coils when the field magnet 1a moves. A train of pulses representing a detected relative position by the position detecting device 3 is transferred to a current waveform pattern generator 5 and a phase-difference detector 6. The current waveform pattern generator 5 may be called synchronized type oscillator and is used for forming a current waveform pattern 7 synchronized with the position pulse train 4. The generator 5 may readily be constructed by, for example, a phase locked loop circuit comprised of a phase comparator, a low-pass filter, a DC amplifier and a voltage controlled oscillator (VCO). A frequency pattern generator 8 produces a frequency pattern 10 corresponding to a speed pattern 9 of the vehicle. A speed v of the vehicle and a frequency f of the LSM is related by the following equation (1)

$$v = 2f \times l_p \qquad (1)$$

wherein $l_p$ is a pole pitch of the LSM. As seen from the equation, consideration of only the frequency is satisfactory in this case.

Figure 2:
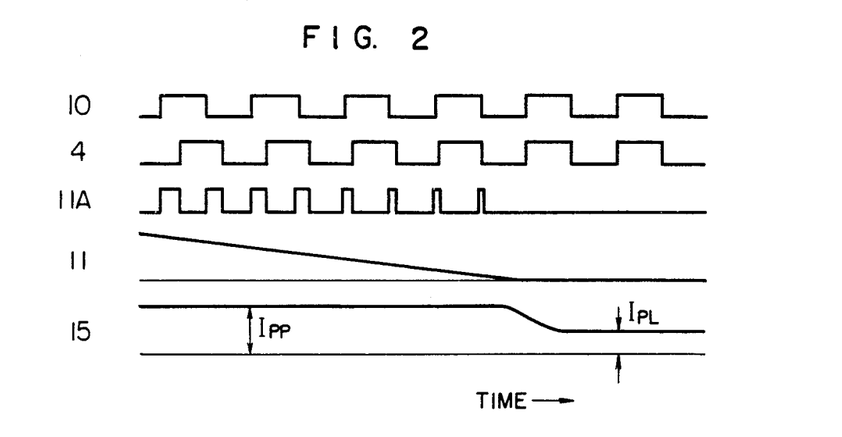
FIG. 2 shows a time chart which is useful in explaining the operation of the control system shown in FIG. 1 when a speed of a linear synchronous motor is lower than a speed pattern.

A phase difference detector 6 detects a phase difference between a signal representing the frequency pattern 10 and the position pulse train 4. A phase difference compensator 12 increases, in accordance with the phase difference 11, a propulsion force pattern 13 (a current waveform crest value pattern) to accelerate the LSM when the position pulse train is lagged from the frequency pattern signal. On the other hand, when the former leads the latter, the compensator 12 decreases the current crest value pattern 13 to decelerate the LSM or adjusts the current crest value with a negative polarity so as to effect a regeneration brake. As seen from the waveforms shown in FIG. 2, when the position pulse train 4 lags behind the frequency pattern signal 10 (the real speed lags behind the speed pattern), the phase difference detector 6 produces the output signal 11 with respect to a phase difference 11A. In FIG. 2, the phase difference waveform 11A of a single phase is illustrated for purpose of explaining the principle of the present invention; however, the phase differences of three phases in the actual case are obtained and averaged. In FIG. 2, a change of the phase differences is illustrated in an exaggerative manner for ease of illustration, but the change of the actual phase differences is more gentle. Accordingly, the output signal from the phase difference detector 6 may be considered smooth as shown. A phase difference compensator 12 produces a signal 13 representing a current crest value in accordance with the phase difference 11. The current crest value signal 13 is applied to a current limiter 14 where its maximum amplitude is limited to be a current crest value pattern 15. When the phase difference 11 is large in FIG. 2, the current crest value pattern signal 15 has a limit value $I_{pp}$ and the LSM must be accelerated at the maximum propulsion force to narrow the lagged phase difference. When the phase difference 11 is sufficiently small, the current crest value is $I_{PL}$. Under this condition, when a propulsion force against the train resistance at a speed corresponding to the current crest value $I_{PL}$ is generated, propulsion force balance is set up to allow the running of the vehicle. A multiplier 16 multiplies the current waveform pattern 7 (sinusoidal pattern) synchronized with the position pulse train 4 by the current crest value pattern 15 to form a current pattern 17 to be fed to the armature coils 2. The current pattern 17 is synchronized with the position pulse train 4 and has a current pattern (generally, a sinusoidal waveform) with an amplitude corresponding to a propulsion force necessary for driving the vehicle. A current controller 18 controls a power converter 22, such as a thyristor type cycloconverter, to decrease the difference between an armature coil current 20 detected by a current detector 19 and the current pattern 17 as a result of the comparison by a comparator 21, and applies a current following the current pattern 17 to the armature coils 2. As a result, a magnetic interaction between the armature coil current with the field magnet on the vehicle 1 causes the vehicle 1 to move.

Figure 3:
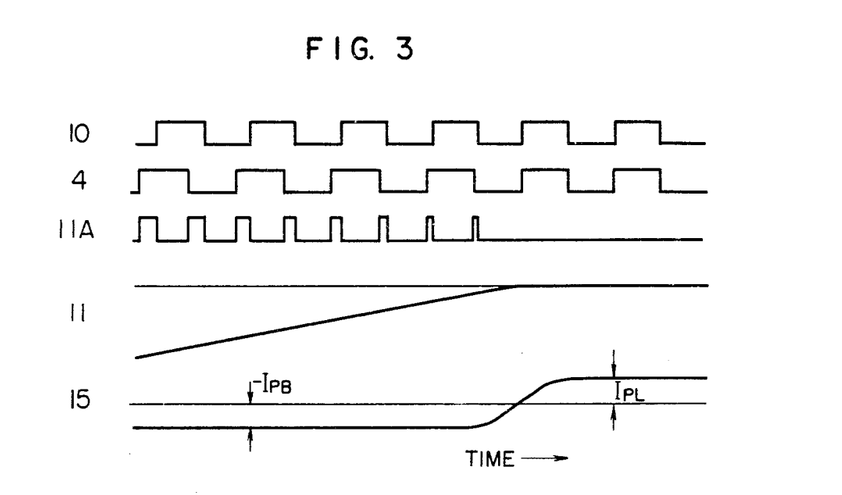
FIG. 3 shows a time chart which is useful in explaining the operation of the control system shown in FIG. 1 when the speed of the synchronous motor is higher than the speed pattern.

FIG. 3 shows waveforms for illustrating the operation of the control system shown in FIG. 1 when the phase of the position pulse train 4 leads the frequency pattern 10 (the real speed is faster than the speed pattern). At this time, the current crest value pattern 15 is negative. The phase of the armature coil current with respect to the induced voltage of the LSM is reverse compared to the case of FIG. 2 and the LSM is in the brake mode. The current crest value pattern 15 when the lead phase difference is large, the current crest value pattern 15 has the negative maximum value —$I_{PB}$, so that the LSM is in the braking mode. When the phase difference is small, the vehicle is operated with a propulsion force corresponding to the train resistance at the speed corresponding to the small phase difference.

The phase difference compensator 12 receives the phase difference signal 11 and produces the current crest value signal 13. A transfer characteristic of the phase difference compensator 12 may be of the normal proportional, the proportional integration or the lead/lag compensation type. The limit value of the current limiter 14 is set so as not to impair a smooth ride. The limit value of the limiter for the braking mode is smaller than that for the other mode by an amount of the train resistance.

As described above, the present embodiment of the control system for a linear synchronous motor obtains the phase difference between the position signal pulse train with a frequency corresponding to the speed of the linear synchronous motor LSM and controls the LSM by adjusting the magnitude of the current pattern on the basis of which a current is fed into the armature coils of the LSM. Therefore, the speed control is accurately and well following the speed pattern (frequency pattern). Specifically, when the position signal has a small phase difference with respect to the frequency pattern signal, the frequency of the pulse train corresponding to the speed of the vehicle is equal to the frequency of the frequency pattern corresponding to the speed pattern. Therefore, the speed control accuracy is considerably improved. In other words, even in the case of a minute frequency difference which serves as an error in view of the speed computing accuracy, the phase difference first increases. The present invention detects this phase difference to adjust the propulsion force, so that the speed control accuracy may remarkably be improved. In changing a speed pattern, a phase difference between the frequency pattern and the position pulse train first increases, and therefore the control system of the present invention adjusts the magnitude of the current pattern, or the propulsion force of the LSM. Therefore, the control system of the present invention is greatly improved in the follow-up performance for the speed pattern (frequency pattern), compared to the known control system in which a speed difference is used for the propulsion force control.

Figure 4:
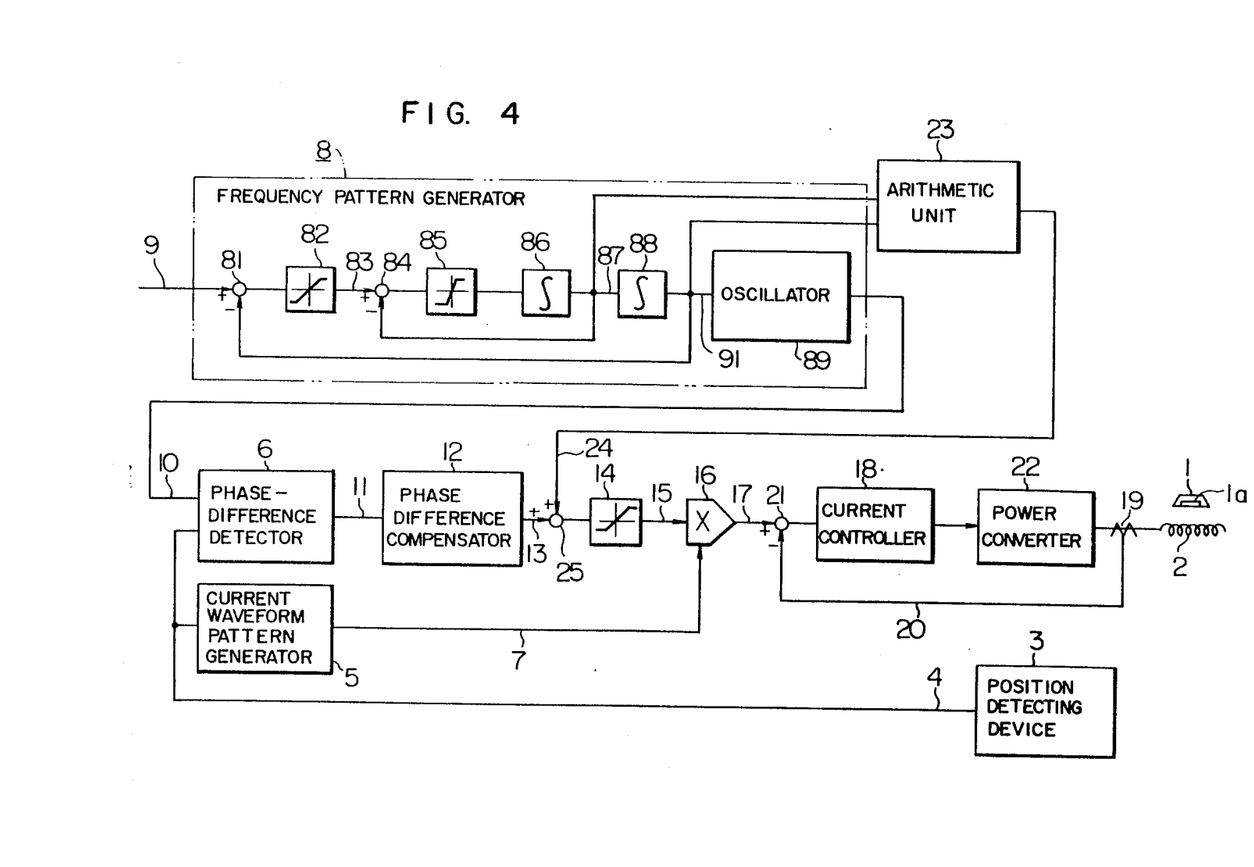
FIG. 4 shows a schematic block diagram of a second embodiment of a speed control system for a linear synchronous motor according to the present invention which is designed in consideration of a predictive propulsion force on the basis of the speed pattern.

FIG. 4 shows a block diagram of a practical embodiment of a control system for a linear synchronous motor. In FIG. 4, the portions designated by like reference numerals in FIG. 1 are the same those as in FIG. 1 and hence no explanation will be given. The embodiment shown in FIG. 4 forms a frequency pattern 10 by the frequency pattern generator 8 and applies it to the phase difference detector 6, as in the previous embodiment. In the present embodiment, a current crest value 24 corresponding to a necessary propulsion force predicted for the current running of the vehicle, which is formed by a current crest value reference arithmetic unit 23, is added to the output signal from the phase difference compensator 12, by an adder 25. The result of the addition from the adder 25 is applied to the current limiter 14 to form the current crest value pattern. This feature makes the present embodiment different from the FIG. 1 embodiment. The description follows placing an emphasis on this feature.

The frequency pattern generator 8 is used for forming a speed pattern 91 with respect to time so that, when the speed reference 9 is set up, an acceleration and an acceleration rate fall within limit values, thereby to retaining a smooth ride. Specifically, a difference between the speed reference 9 and the speed pattern 91 obtained by a comparator 81 is applied to a deceleration limiter 82 where it is converted into an acceleration command 83 by an acceleration limiter 82. The command 83, after passing through a comparator 84, is applied to an acceleration rate limiter 85 where an acceleration rate is limited if necessary. The output signal from the limiter 85 is integrated by an integrator 86 to form an acceleration pattern 87. A feedback loop formed through the comparator 84 for comparing the acceleration command 83 with the acceleration pattern 87 is used for forming the acceleration rate pattern following the acceleration command 83 below the limit value. When the acceleration pattern 87 is integrated by an integrator 88, the speed pattern 91 is formed. The speed pattern is so formed that the acceleration and the acceleration rate are both within the limit values. By driving an oscillator 89 by the speed pattern 91, a frequency pattern 10 is formed.

The embodiment shown in FIG. 4 adjusts the magnitude of the LSM current in accordance with the phase difference between the frequency pattern having the acceleration and the acceleration rate within the limit values and the position signal. Therefore, the present embodiment further improves the follow-up performance of the control system for the frequency pattern and a smooth ride.

The current crest value reference arithmetic unit 23 shown in FIG. 4 computes the necessary propulsion force (assumed as Fp) predicted on the current running on the basis of the acceleration pattern 87 (assumed as an acceleration $a_p$) and the speed pattern 91 (assumed as a velocity Vp), and a reference current crest value (assumed as Ip), and adds the reference current crest value to the output signal from the phase difference compensator to provide the magnitude of the current pattern. The predicted necessary propulsion force Fp is given by $$Fp = Ma_p + F_D(Vp) \quad (2)$$

where M is a mass of the vehicle and $F_D(Vp)$ is the train resistance when the vehicle runs at a speed Vp. The propulsion force FLSM of the LSM is proportional to the current crest value and hence $$F_{LSM} = KIp \quad (3)$$

By using the equations (2) and (3), the predicted current crest value for the present running may be calculated. Therefore, the current crest value 24 (or some percent of the value) is added to the current crest value 13 of the phase difference compensator 12 by the adder 25. The result of the addition is used as the current crest value pattern. Thus, the compensation amount by the phase difference compensator is only the difference between the current crest values corresponding to the predicted and the actual propulsion force. Therefore, the dynamic range of the phase difference compensator may be narrow and hence easy to make control. In short, the predicted current crest value is provided through a feed forward and only the difference between the predicted and actual crest ones is compensated by a feedback loop including the phase difference detector 6.

Figure 5:
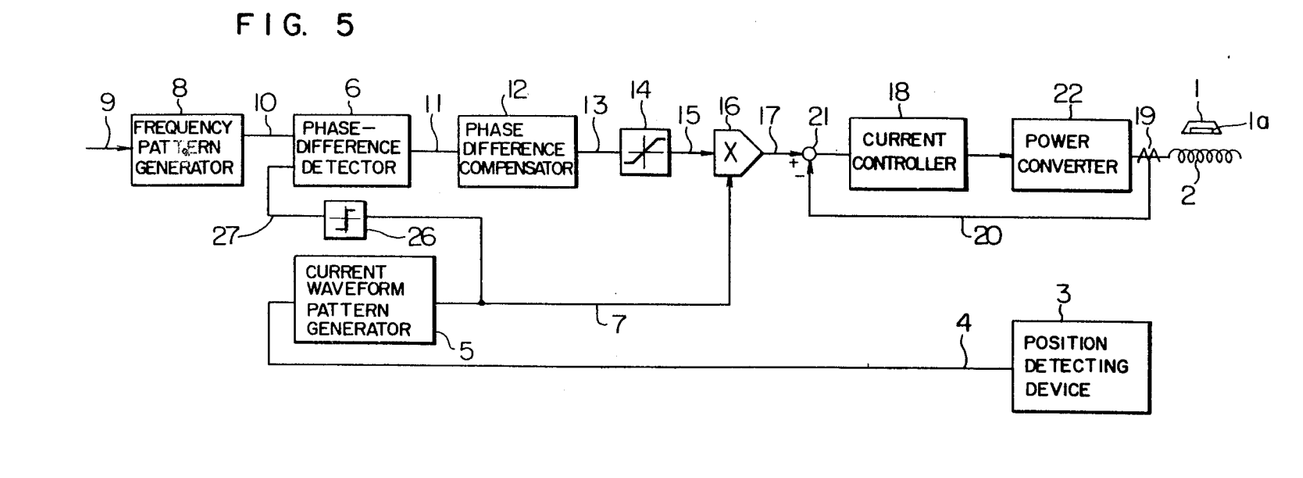
FIG. 5 shows a schematic block diagram of a third embodiment of a control system for a linear synchronous motor according to the present invention with a phase difference computing means using a current waveform pattern.
Figure 6:
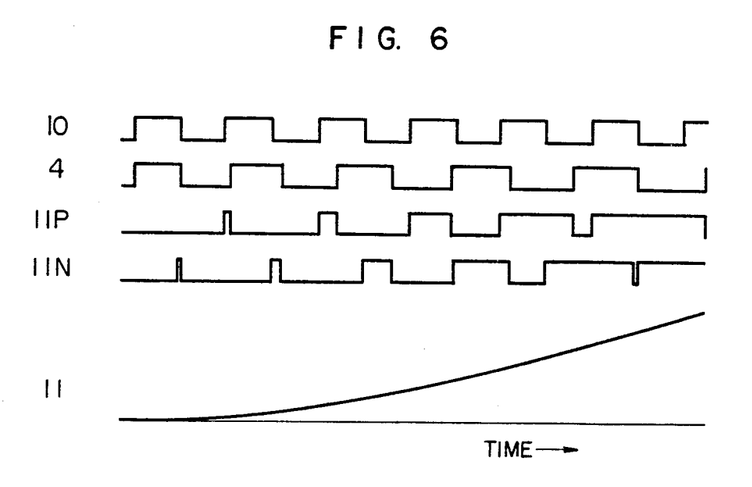
FIG. 6 shows a time chart which is useful in explanation of a phenomenon of a phase difference expansion.

The embodiments as mentioned above use each the phase difference between the frequency pattern 10 and the phase detecting pulse train 4 for the speed control of the LSM. A phase difference between the output signal from the current waveform pattern generator 5 and the frequency pattern 10 may also be used for the same purpose, as illustrated in FIG. 5, and has the following advantages. In the figure, like numerals designate like portions in FIG. 1. In the embodiment shown in FIG. 5, the output signal from the current waveform pattern generator 5 is formed through a wave shaper 26. Then, the control system of the present embodiment obtains a phase difference between output signal from the wave shaper 26 and the frequency pattern 10. The current waveform pattern generator 5 is constructed by the PLL (Phase Lock Loop) circuit, as described above. Even when the position pulse train is influenced by noise interference of it has some drop-out of pulses, the current waveform is little influenced. Therefore, there is eliminated a case where the phase difference detector detects an abnormal phase difference to provide an irregular propulsion force for the LSM and impair a smooth ride. In FIG. 6 embodiment, however, in a running mode to stop the current supply to the armature coils, the so-called coasting running, the frequency of the position pulse train 4 deceases in accordance with a natural deceleration of the vehicle, irrespective of the frequency pattern. Accordingly, the phase difference 11 sporadically increases, with the result that the real speed of the vehicle is much removed from the frequency pattern. Accordingly, FIG. 5 embodiment is problematic in the view of safe operation. Additionally, when the vehicle transfers from the coasting running to the powering resulting from the current feed to the armature coils, there is a non-control state until a transient erroneous incorrect phase difference is restored to a correct one. Waveforms 11P and 11N shown in FIG. 6 illustrate in detail the phase difference between the frequency pattern 10 and the position pulse train 4. The waveform 11P illustrates phase differences between the positive edges of the frequency pattern and the position signal. The waveform 11N are phase differences between the negative edges of those waveforms. A waveform 11 is the one when those phase differences are averaged.

Figure 7:
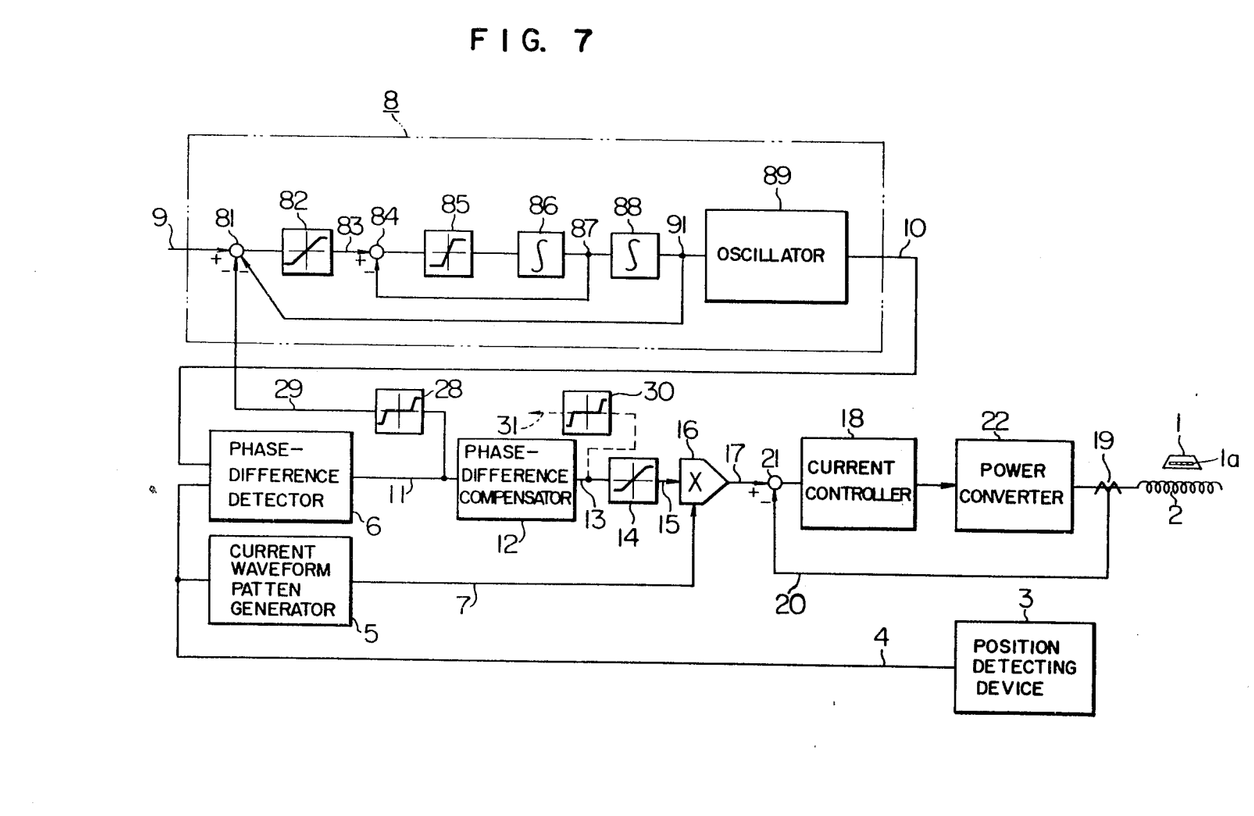
FIG. 7 shows a schematic block diagram of a fourth embodiment of a control system for a linear synchronous motor according to the invention with a means for controlling a speed frequency pattern by a phase difference expansion.

To avoid the problems of FIG. 6 embodiment, an embodiment of the control system for the LSM uses a phase difference expansion detector 28. The detector 28 detects a state that the phase difference 11 exceeds a predetermined limit value (±120°, for example) and negatively feeds back the output signal thereof to a comparator 81 of the frequency pattern generator 8. With this arrangement, the frequency pattern is automatically adjusted to the one corresponding to the real speed. It is evident that a signal 31 formed by processing the current crest value 13 from the phase difference compensator 12 by a crest value expansion detector 30 may be used for the feedback signal.

Such a configuration realizes a speed control for the LSM which is improved in the speed control accuracy of the LSM and the follow-up for the frequency pattern with the lessened difference between the frequency pattern and the real speed of the vehicle.

Figure 8:
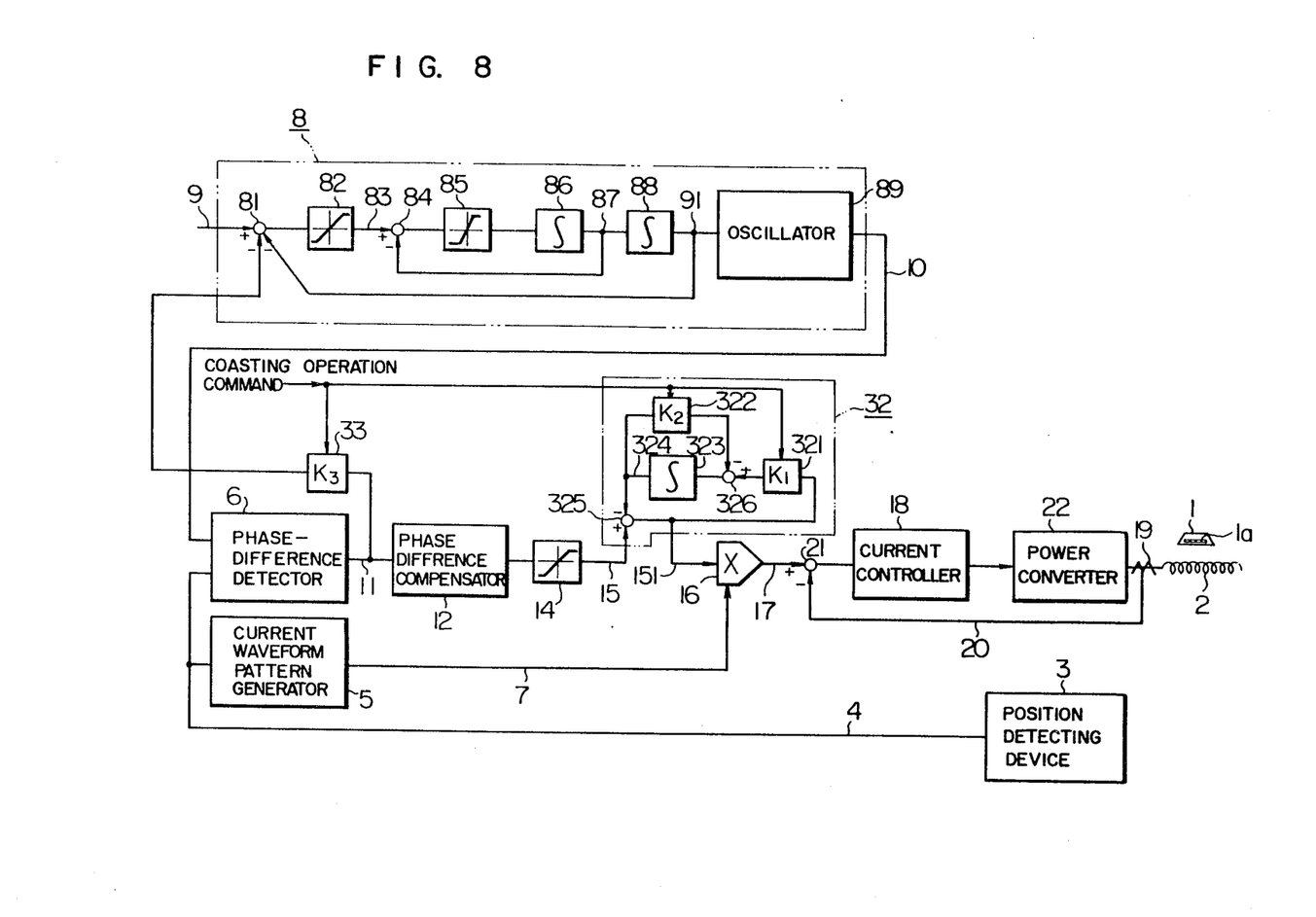
FIG. 8 shows a schematic block diagram of an embodiment of a control system for a linear synchronous motor according to the present invention with a device for controlling a rapid change of a propulsion force by a coasting running command.
Figure 9:
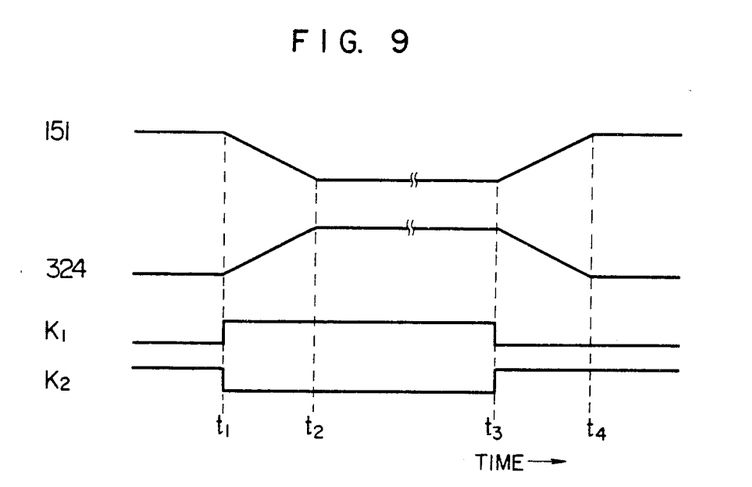
FIG. 9 shows a time chart for illustrating the operation when a coasting running command is issued and stopped.

FIG. 8 shows another embodiment of a control system for the LSM. In FIG. 8, a current crest value pattern adjustor 32 operates in the following manner. When a coasting command is issued at a time point $t_1$ in FIG. 9 illustrating operation waveforms, variable coefficient units 321 and 322 in the current pattern adjustor 32 change coefficients K1 and K2 from 0 to 1 and from 1 to 0, respectively. Accordingly, the output signal 324 from an integrator 323 progressively increases at an integrating time constant, as shown in FIG. 9. A current crest value pattern 151 is obtained by subtracting the output signal 324 from the current crest value 15, and thus gradually decreases as shown in FIG. 9 to be zero at time point $t_2$. Incidentally, numeral 326 designates a comparator. When the coasting command is stopped at time point $t_3$, the coefficient K1 is set to 0, while the coefficient K2 is set to 1. Accordingly, the integrator 323 starts the reset at an integration time constant and the output signal 324 gradually decreases. Accordingly, the current crest value pattern 151 increases at a given time constant. At time point $t_4$, the output signal 324 from the integrator becomes zero and the current crest value 151 is equal to the current crest value 15.

As described above, when the coasting command is issued or stopped, the current crest value pattern changes at the given time constant. Accordingly, the propulsion force of the LSM gradually changes, so that the ride feeling is improved without any shock to the vehicle.

In FIG. 8, the negative feedback of the phase difference 11 through the variable coefficient unit 33 to the comparator in the frequency pattern generator 8 provides the following effect. The coefficient K3 of the variable coefficient unit 33 is normally zero and therefore no negative feedback is formed. When the coasting running command is issued, the coefficient is not zero and the negative feedback loop is set up. Therefore, it is possible to prevent an increase of the difference between the speed pattern and the speed of the vehicle in a manner similar to that in FIGS. 5 and 6.

What is claimed is:

1. A control system for a linear synchronous motor comprising:
   a linear synchronous motor having a field magnet and armature coils;
   power converter means for supplying a polyphase AC power of a variable frequency and a variable voltage to said armature coils;
   position detecting means for detecting a relative position of said field magnet to said armature coils;
   means responsive to an external speed pattern and for generating a frequency pattern of said motor;
   means for producing a propulsion force pattern in accordance with a phase difference between the output of said frequency pattern generator and the output of said position detecting means;
   means for generating a current waveform pattern synchronized with the output of said position detecting means;
   means for producing a current pattern of said armature coils by computing the output of said current waveform pattern generator means and the output of said propulsion force pattern producing means; and
   means for controlling said power converter means in accordance with said current pattern.

2. A control system according to claim 1, wherein said propulsion force pattern computing means comprises means for setting the positive and the negative maximum value of said propulsion force pattern at respective different absolute values.

3. A control system according to claim 1, wherein said propulsion force pattern producing means comprises means supplied with said frequency pattern and said current waveform pattern, for producing said propulsion force pattern in accordance with the phase difference therebetween.

4. A control system according to claim 1, further comprising means for computing a predictive propulsion force of said motor, wherein said propulsion force pattern producing means comprises means for producing the propulsion force pattern in accordance with said phase difference and said predictive propulsion force.

5. A control system according to claim 1, further comprising means for decreasing said frequency pattern when said phase difference exceeds a predetermined value.

6. A control system according to claim 1, further comprising means for issuing a coasting running command to said motor and means for gradually decreasing said current pattern in response to said coasting running command.

7. A control system according to claim 6, further comprising means for gradually increasing said current pattern up to the output of said current pattern computing means when said coasting running command vanishes.

8. A control system for a linear synchronous motor comprising:
   a linear synchronous motor having a field magnet and armature coils;
   a power converter means for supplying polyphase power of a variable frequency and a variable voltage to said armature coils;
   position detecting means for detecting a relative position of said field magnet to said armature coils;

means for producing a phase difference between a position pulse train with a frequency proportional to the speed of said linear motor and a frequency pattern corresponding to a speed pattern of a vehicle; and means for adjusting the magnitude of a current fed to said armature coils in accordance with said phase difference.

9. A control system according to claim 8, further comprising means for limiting said phase difference to different positive and negative absolute values.

10. A control system according to claim 8, further comprising means for generating a current waveform pattern synchronized with said position pulse train, wherein said current adjusting means includes means for controlling the crest value of said current waveform pattern in accordance with said phase difference.

11. A control system according to claim 8, further comprising means for decreasing said frequency pattern when said phase difference exceeds a predetermined value.

12. A control system according to claim 8, further comprising means for issuing a coasting running command to said motor and means for gradually decreasing a current flowing through said armature coils in response to said coasting running command.

13. A control system according to claim 8, wherein said position detecting means generates the position pulse train, and further comprising generator means for generating the frequency pattern.

14. A control system for a linear synchronous motor comprising:

a linear synchronous motor having a field system and an armature coil;

power converter means for supplying a poly-phase AC power of a variable frequency and a variable voltage to said armature coil;

means for detecting a relative position between said field system and said armature coil;

means for setting a desired speed pattern for said motor;

means for computing a propulsion force pattern in accordance with a difference between said speed pattern and a signal corresponding to the actual speed of said motor;

means responsive to said propulsion force pattern and an output of said relative position detecting means, for controlling said power converter means to cause a current synchronized with an induced voltage of said motor to flow through said armature coil;

wherein said propulsion force pattern computing means receives a waveform pattern which varies with time at a frequency proportional to a desired speed and a feedback waveform which varies with time at a frequency proportional to the actual motor speed to thereby compute the propulsion force pattern in accordance with the phase difference between said waveform pattern and said feedback waveform.

15. A control system according to claim 14, wherein said propulsion force pattern computing means comprises means for setting the positive and the negative maximum value of said propulsion force pattern at respective different absolute values.

16. A control system according to claim 14, further comprising means responsive to an output of said relative position detecting means for producing a motor current waveform, whereby said propulsion force pattern computing means receives said waveform pattern and said motor current waveform so as to compute the propulsion force pattern in accordance with the phase difference between said waveform pattern and said motor current waveform.

17. A control system according to claim 14, further comprising means for computing a predictive propulsion force of said motor, wherein said propulsion force pattern producing means comprises means for producing the propulsion force pattern in accordance with said phase difference and said predictive propulsion force.

18. A control system according to claim 14, further comprising means for decreasing the magnitude of said waveform pattern in response to the fact that said phase difference exceeds a predetermined value.

19. A control system according to claim 14, further comprising means for issuing a coasting running command to said motor and means for gradually decreasing the output current of said power converter means in response to said coasting running command.

20. A control system according to claim 19, further comprising means for gradually increasing the output current of said power converter means up to a value corresponding to an output of said propulsion force pattern computing means in response to the extinction of said coasting running command.

21. A control system according to claim 14, wherein said relative position detecting means generates the feedback waveform, and further comprising generator means for generating the waveform pattern.

* * * * *